April 28, 1925.
C. B. MILLS
METHOD OF CENTRIFUGAL CASTING
Filed July 17, 1919
1,535,330
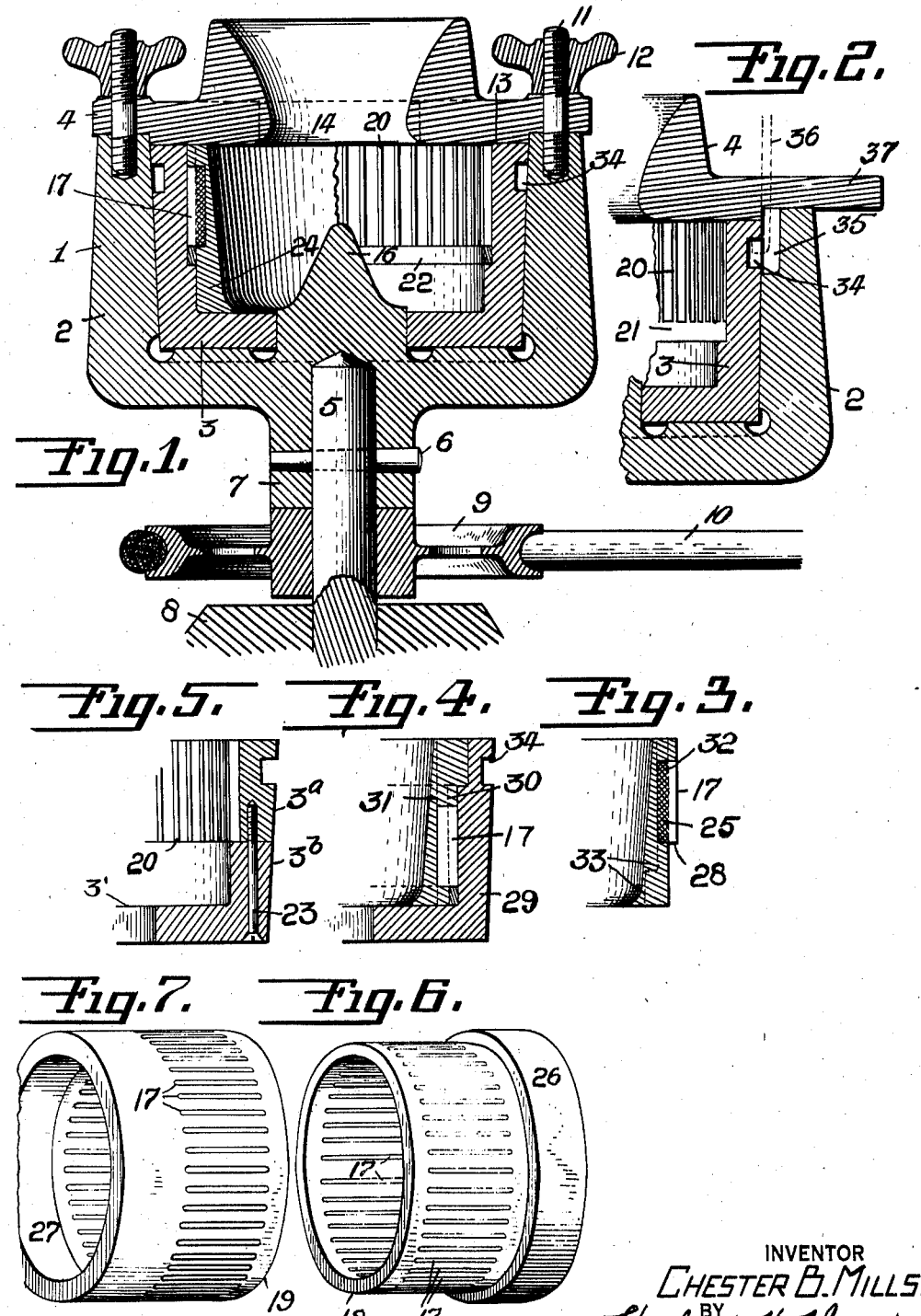
INVENTOR
CHESTER B. MILLS.
BY
Herbert H. Thompson
his ATTORNEY Patented Apr. 28, 1925.

1,535,330

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

METHOD OF CENTRIFUGAL CASTING.

Application filed July 17, 1919. Serial No. 311,489.

*To all whom it may concern:*

Be it known that I, CHESTER B. MILLS, a citizen of the United States of America, residing at 26 Stratford Road, Brooklyn, in the county of Kings and State of New York, have invented certain new and useful Improvements in Methods of Centrifugal Casting, of which the following is a specification.

This invention relates to a method and means for producing castings containing inserts, and more especially to a method of casting machine elements comprising an annular metallic member such as a ring or drum having distributed at intervals therearound, metallic inserts.

The principal object of the invention is to devise a method whereby castings of this nature may be made at a low cost, produced more rapidly and with better results than has heretofore been possible.

Referring to the drawings wherein I have shown what I now consider to be the preferred form of my invention:

Fig. 1 is a vertical cross section of a centrifugal type of mould which may be used in connection with my invention.

Fig. 2 is a section of a portion of a mould showing a slight modification.

Fig. 3 is a fragmentary section of a ring cast in accordance with my invention, before machining.

Figs. 4 and 5 illustrate methods of making the moulds.

Figs. 6 and 7 are perspective views of finished castings made in accordance with my invention.

In Fig. 1 the mould 1 is shown as comprising an outer member or pot 2, an inner member or form 3, and a cover 4. The pot 2 may be mounted in any suitable manner for rotation on a vertical axis. For this purpose it is shown as mounted on a spindle 5 and pinned thereto by a pin 6 passing through the stem 7 of the pot and the spindle. Spindle 5 may in turn be mounted for rotation in a bearing or base 8. A pulley 9 is shown on spindle 5 and adapted to be turned by a belt 10 actuated from some outside source.

The form 3 is shown as fitting snugly into the pot 2, while the cover 4 is secured to the pot by bolts 11 and thumb nuts 12. Said cover engages the upper edge 13 of form 3 holding it firmly in place, and reaches inwardly so as to prevent the molten metal when poured into the mould from rising above the edge of said form; an opening 14 being provided in the cover for the entry of the poured metal. A projection 16 may be provided in the bottom of the pot 2, reaching up through form 3, of a spreading character as shown for diverting the metal toward the circumference of the form when it is poured.

In the form of the invention shown here, the metallic inserts are in the nature of strips 17 distributed at equal distances around the finished castings 18, 19 (Figs. 6 and 7). In order to hold these inserts in place in the mould while the casting is being made, they may be placed in grooves 20 provided in the form 3. The said grooves may be cut by any suitable method, as by turning an annular groove 21 in the inner circumference of the form 3 as shown in Fig. 2; then cutting the several slots 20 down to said groove 21, and filling the groove with a ring 22 (Fig. 1). The slots will thus be of uniform depth throughout their entire length; the object in turning groove 21 and filling the same being obviously to dispose of the slanting end of the slots caused by the cutting tool.

As shown in Fig. 5 the form 3' may be made in two parts 3ª and 3ᵇ; the slots 20 being cut all the way across the portion 3ª and the two parts being secured together as by means of screws or bolts 23.

In the operation of the mould, the several parts are assembled as shown in Fig. 1; a strip 17 being positioned in each of grooves 20. The mould is then revolved on its vertical axis 5 to a suitably high speed and the molten metal poured in through opening 14. Preferably the mould should be heated before the final pouring for the casting so as to avoid too rapid chilling of the metal.

Centrifugal force caused by the rotation of the mould will obviously hold the strips 17 firmly in slots 20 while the metal is being poured. As the metal is poured the centrifugal forces cause it to rise and become distributed around the inner circumference of form 3, and to flow into a cylinder of almost uniform inner radius throughout its length, as shown at 24, enveloping all of that portion of strips 17 projecting out of slots 20. The tremendous centrifugal forces will also cause the metal 24 to become intensely compact around said strips, while the shrinkage stresses in cooling will greatly add to the gripping effect of the poured metal upon the strips. The sides of strips 17 may also be knurled or otherwise roughened as shown at 25 to further improve the gripping effect between the strips and the metal 24. It will, of course, be understood that the inserts should not have a materially lower melting point than the metal forming the supporting material. Such inserts are preferably of iron or steel and the supporting material of soft or easily cast metal. It, therefore, follows that in practice the supporting material has a lower melting point than the iron or steel inserts.

While my method of casting may be employed to produce a great variety of kinds of castings with inserts, I have here shown its application in the production of the elements of a magnetic torque applying device or drag; the inner member 18 being shown in Fig. 6 and the outer member 19 in Fig. 7. As shown in Fig. 6, the inner member 18 comprises a cylinder having an outer flange 26 at one end thereof, while the outer member 19 comprises a larger cylinder adapted to fit loosely over cylinder 18 up to flange 26 and is in turn provided with an inner flange 27.

In machining these cylinders after the casting operation, the portion 28 of the insert strips 17 which rested in slots 20 may be turned down flush with the surface of the cylinder, while the inside of the cylinders on the other hand may be turned down flush with the strips 17, so that the strips 17 are exposed on both the inside and outside of the cylinder as shown. In producing the member shown in Fig. 6 a form 29 shown in Fig. 4 may be employed, and the casting being machined down to the dotted line 30 on the outside and line 31 on the inside. The member 19 (Fig. 7) on the other hand may be cast in a form 3 (Fig. 1) and the casting turned down to dotted lines 32, 33 as indicated in Fig. 3.

In order to remove the form 3 from the bucket 2, an annular groove 34 may be provided on the outside of said form, and a few vertical slots 35 (Fig. 2) provided in the bucket 2 for the insertion of gripping tongs represented in dotted lines 36, whereby the form may be withdrawn. Projections 37 may, if desired, be provided on the cover 4 of the mould to facilitate the placing and removal of said cover.

When it is considered that in a magnetic drag, as shown here, the strips 17 are of a magnetic metal, such as steel, and the supporting members 18, 19 are of a non-magnetic metal, it will be readily appreciated that any method of making the cylinders and then inserting the strips 17 by machining methods would require a great deal of work, consuming much time and resulting in a costly article, whereas by casting the members by my method much time and labor are saved and a very compact and rigid structure is produced at a low cost. One of the great advantages of my method of casting which renders this possible is thus very apparent.

Having described my invention, what I claim and desire to secure by Letters Patent is:

1. A mould, comprising a pot mounted for rotation on a vertical axis, a form adapted to fit into said mould, said form being provided with means for holding inserts, and a cover for said pot having an opening therethrough.

2. The method of producing ring-like castings with inserts which comprises placing the inserts in the proper position in a mould, revolving the mould, pouring the molten metal into the mould while the latter is revolving, permitting the casting to harden while the mould is revolving, and boring out the casting so produced so that an interior shoulder is formed adjacent the bottom of the casting.

3. The method of producing a ring like machine element having spaced inserts which consists in employing a mold having slots around the inner periphery thereof, placing the inserts in said slots, revolving the mold while pouring in the molten supporting material to form a hollow cylindrical member, and machining off the projecting portion of said inserts caused by the positioning of the same in said slots.

4. An article of manufacture comprising a centrifugally cast hollow cylindrical member of non-magnetic metal and circumferentially spaced, axially extending inserts of magnetic material cast in said metal.

5. An article of manufacture comprising a centrifugally cast hollow cylindrical member of non-magnetic metal and circumferentially spaced, axially extending inserts of magnetic material having roughened edges cast in said metal.

6. An article of manufacture comprising a centrifugally cast hollow cylindrical member of non-magnetic metal centrifugally compacted, and circumferentially spaced, axially extending inserts of magnetic material cast under pressure in said metal.

7. An article of manufacture comprising a centrifugally cast hollow cylindrical member of non-magnetic metal having a circumferentially extending thickened portion adjacent an end and circumferentially spaced, axially extending inserts of magnetic material cast in said metal.

8. A magnetic clutch member comprising a bimetallic hollow cylindrical member having a body formed of non-magnetic material and circumferentially spaced, axially extending magnetic inserts held under pressure in said body against magnetic and centrifugal forces.

9. A mold, comprising a pot mounted for rotation about an axis, a form adapted to fit into said pot and provided with means for holding inserts, and a projection extending into the interior of the form for diverting metal toward the circumference of the form when the metal is poured.

10. A mold, comprising a pot mounted for rotation about an axis, and a form adapted to fit into said pot and provided with circumferentially spaced slots extending parallel to said axis for receiving inserts.

11. A mold comprising a pot mounted for rotation about an axis, a form adapted to fit into said pot and provided with means for holding inserts, a cover for the pot having an opening therethrough whereby molten metal may be poured into the mold, and a projection extending into the interior of the form for diverting the metal toward the circumference of said form when said metal is poured.

12. The process of producing a ring-like member having inserts spaced in the periphery thereof, which consists in positioning the inserts within a mold, revolving the mold, pouring molten metal into said mold while the latter is revolving to form a hollow cylindrical member, and subsequently machining said inserts and member to cause the inserts to become substantially flush with both the internal and external surfaces of said member.

13. A mould, comprising a pot mounted for rotation on a vertical axis, a form adapted to fit into said pot, said form being provided with means for holding inserts.

14. The method of producing ring-like castings with inserts which comprises placing the inserts in the proper position in a mould, revolving the mould, pouring the molten metal into the mould while the latter is revolving so that the inserts are embedded in the outer surface of the casting, permitting the casting to harden while the mould is revolving, and boring out the casting so produced until the inserts are flush with the inner surface of the casting.

In testimony whereof I have affixed my signature.

CHESTER B. MILLS.